US012639992B2

(12) United States Patent
Lee et al.

(10) Patent No.: US 12,639,992 B2
(45) Date of Patent: May 26, 2026

(54) RIDE MONITORING SYSTEM

(71) Applicant: HopSkipDrive, Inc., Los Angeles, CA (US)

(72) Inventors: Sophy Lee, Los Angeles, CA (US); Corey McMahon, Los Angeles, CA (US); Sadie Bascom, Los Angeles, CA (US); Amanda McConnell, Los Angeles, CA (US); Cole Nelson, Los Angeles, CA (US); Alexander Parsons, Los Angeles, CA (US); David Werner, Los Angeles, CA (US)

(73) Assignee: HopSkipDrive, Inc., Los Angeles, CA (US)

( * ) Notice: Subject to any disclaimer, the term of this patent is extended or adjusted under 35 U.S.C. 154(b) by 224 days.

(21) Appl. No.: 17/321,179

(22) Filed: May 14, 2021

(65) Prior Publication Data

US 2021/0358233 A1      Nov. 18, 2021

Related U.S. Application Data

(60) Provisional application No. 63/024,869, filed on May 14, 2020.

(51) Int. Cl.
| | |
|---|---|
| *H04W 64/00* | (2009.01) |
| *G06Q 10/02* | (2012.01) |
| *G07C 5/06* | (2006.01) |
| *H04W 4/02* | (2018.01) |
| *H04W 4/44* | (2018.01) |

(52) U.S. Cl.
CPC ............... *G07C 5/06* (2013.01); *G06Q 10/02* (2013.01); *H04W 4/027* (2013.01); *H04W 4/44* (2018.02)

(58) Field of Classification Search
CPC ......... G07C 5/06; G06Q 10/02; H04W 4/027; H04W 4/44; H04W 4/029; G07B 15/02
USPC ....................................... 455/456.1
See application file for complete search history.

(56) References Cited

U.S. PATENT DOCUMENTS

| | | | | |
|---|---|---|---|---|
| 9,672,719 | B1 * | 6/2017 | Hollenstain | G08B 21/18 |
| 9,832,241 | B1 * | 11/2017 | Hayward | G07C 5/008 |
| 10,134,285 | B1 * | 11/2018 | Isler | H04N 1/00137 |
| 2017/0300049 | A1 * | 10/2017 | Seally | G08G 1/202 |
| 2020/0065711 | A1 * | 2/2020 | Clément | B60W 40/10 |
| 2020/0334762 | A1 * | 10/2020 | Carver | G07C 5/0825 |

* cited by examiner

*Primary Examiner* — Tanmay K Shah
(74) *Attorney, Agent, or Firm* — JD Harriman; Foundation Law Group LLP

(57) ABSTRACT

The system is an integrated solution that provides end-to-end visibility for 3rd party observers (parents, school administrators, socials workers, etc.), and system safety personnel ("Safe Ride Support Specialists") to monitor each trip in real-time for safety related anomalies. These incidents generate alerts that are prioritized and distributed to the appropriate party to take action through a combination of automated and manual processes. An advantage of the system is that it does not require the passenger to have a cell phone or other mobile device. In addition, the system is active instead of passive, with alerts being issued to observers in response to certain triggers. In addition, the system can take automated actions to preserve passenger safety.

10 Claims, 9 Drawing Sheets

RIDE MONITORING SYSTEM

This patent application claims priority to U.S. Provisional Patent Application No. 63/024,869 filed on May 14, 2020, which is incorporated by reference herein in its entirety

BACKGROUND OF THE SYSTEM

Currently, transportation network companies ("TNCs") offer technology platforms that enable drivers and ride requesting passengers to connect with one another and arrange for transportation. TNCs create, maintain, and operate these platforms, which individual drivers and passengers can access online and/or through a smartphone application. The goal of TNCs is to overcome the economic frictions that would otherwise preclude passengers and drivers from connecting and transacting directly with one another. Transportation platforms are used by millions of drivers and passengers each week. Parents have begun utilizing these systems to help arrange for rides their children need for school, practices, events, and the like, and to replace or supplement car-pooling requirements.

TNCs are regulated by local and state agencies to ensure that the platforms are safe to use by drivers and passengers. For example, TNC drivers must pass a background check and use a safe, operating vehicle to give rides to passengers they connect with through the platform. Safety is a critical component of all rides resulting from interactions between users of a TNC platform, but especially for dependent passengers (e.g., minors, seniors, disabled persons, and the like) who may lack the agency and skills to react to dangerous situations. Although rides may be monitored using GPS technology enabled services, more is needed to promote safe use of a TNC platform used primarily by dependent passengers.

SUMMARY

The ride monitoring system ("system") is an integrated solution that provides end-to-end visibility to TNCs as well as users of a TNC platform (e.g., parents, school administrators, socials workers, guardians, caretakers, etc.). The system uses innovative technology to monitor trips in real-time for safety-related anomalies. The system flags such anomalies and generates alerts that are prioritized and addressed through a combination of automated and manual processes. An advantage of the system is that it does not require passengers to have a cell phone or other mobile device during the trip.

DETAILED DESCRIPTION OF THE SYSTEM

The system is a method and apparatus designed to promote safe rides for drivers and passengers who use TNC platforms, particularly for rides involving the transportation of dependent passengers and other individuals who may not have a cell phone or other mobile device during a ride. In one embodiment the system implements a multi-stage procedure for safety. All drivers must meet minimum standards and have passed background checks. The ride procedure itself is designed to maximize the safety of the passenger by providing identification of the driver and vehicle in advance with visibility to all credentials, confirming pick up and drop off locations and times, and multi-factor authentication and confirmation for passengers and drivers.

The present system is described in terms of at least one minor passenger using the service. It should be understood that the service has equal applicability to any dependent passenger or other passenger using the service without departing from the scope and spirit of the system.

Figure 1:
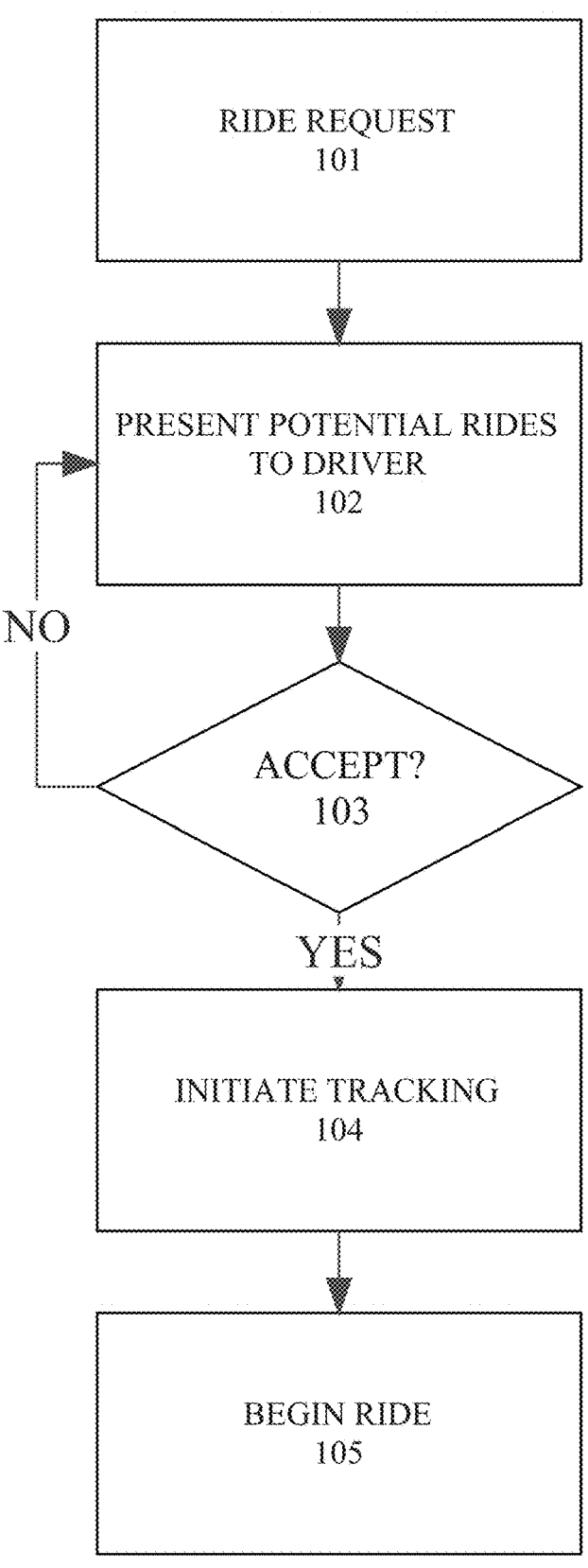
FIG. 1 is a flow diagram illustrating the scheduling of a ride in an embodiment of the system.

FIG. 1 is a flow diagram illustrating the operation of the system in arranging a ride for a passenger. At step 101, a user initiates a ride request online or through a smartphone application. The system may be accessed by any suitable computing device, including desktop, laptop, pad, mobile device, and the like. In one embodiment, the system is embodied in an app that is implemented on the computing device. The ride request, in one embodiment, is made by a parent or guardian of at least one minor passenger and is for a trip in which the minor will not be accompanied by the parent or guardian.

At step 102, the system analyses the request, the start point, end point, time of day, and passenger, and presents a list of potential rides to the driver. In one embodiment, the system consolidates all ride requests, scores them for fit, and presents a sorted list to potential drivers for them to pick from. This "pull" model is unique from all other rideshare companies (which instead push a single trip to a driver for them to accept or reject). The potential driver information used to determine fit may include the driver's qualifications, vehicle requirements, driver preferences, historical driver trip selections, face, vehicle, experience, and the like.

At decision block 103 it is determined if the potential driver has accepted a ride request. If not, the system returns to step 102 and a new potential ride is proposed. If the driver accepts the potential ride at decision block 103, the system proceeds to step 104. At step 104, the driver initiates the tracking system. This is done when the driver checks in for the ride. In one embodiment, check-in may be 60-90 minutes in advance of the ride start time. In one embodiment, the driver uses a system phone and the system initiates the tracking program automatically. In one embodiment, the driver uses system software on the driver's phone.

If the tracking system is not initiated in advance of the ride during check in, alerts are sent to the system Safe Ride Support. In one embodiment, the failure of a driver to initiate the tracking system also initiates an automated process by which the driver is "unclaimed" from the trip, the driver-fare of the trip may optionally be increased, and nearby drivers are notified (e.g., via SMS) of a passenger in need. Those drivers then claim the trip. The alert sent to the system Safe Ride Support allows the system to monitor this process to ensure a new driver is found. Alerts may also be sent to passengers, parents, or other ride organizers with the updated driver and vehicle information. At step 105, the ride begins.

Figure 2:
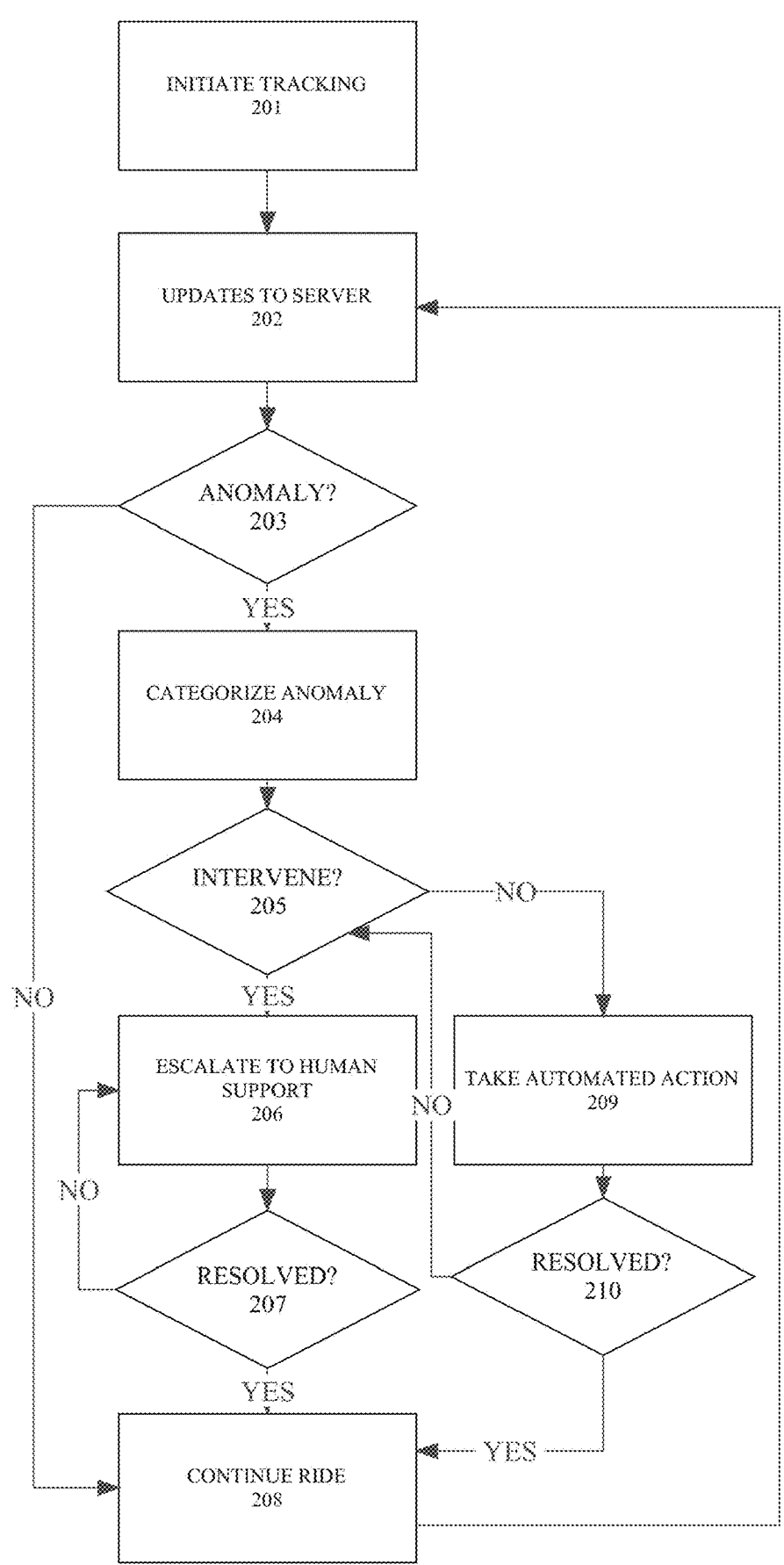
FIG. 2 is a flow diagram illustrating operation during a ride in an embodiment of the system.

FIG. 2 is a flow diagram illustrating the operation of the tracking system during a trip in an embodiment of the system. At step 201 the tracking system is initiated prior to the beginning of a ride and remains active during the ride. At step 202 the driver's device and/or instruments mounted in the vehicle (e.g., phone) send status updates to the system servers. This information includes position, direction, acceleration, speed, and the like. This information may be acquired by GPS, accelerometers, gyroscopes, cameras, user input via a mobile app, and the like. In addition, vehicles themselves can provide data through digital interfaces that can be accessed by the system to provide additional information. For example, the vehicle may provide speed and other information via a digital connection to the vehicles on-board diagnostic (OBD) system, for example.

The vehicle status data may be presented on a digital map showing current location and the route of the vehicle. The map can have indicators of the data and metrics associated with the information collected by the system. The information may be available for automated analysis by the system as well as to human monitors for review. In one embodiment, authorized 3$^{rd}$ parties may have access to the system, such as parents, teachers, and/or guardians.

The information may be combined with other available data, such as traffic conditions on the planned route, expected ride duration, weather conditions, past driver/passenger history, risk scoring models, and the like to predict or identify anomalies.

At decision block 203, the ride monitoring system can determine if a ride anomaly occurs. Ride anomalies include but are not limited to, ride delays and collision detection, and may indicate a problem or risk associated with the trip. Some examples include, but are not limited to:

Ride progression status, including driver is on the way, driver has picked up the minor, driver has dropped off the minor;

Trip detail changes, such as the driver or vehicle information has changed;

Driver has not checked-in;

Driver's estimated time to arrival at pickup is delayed beyond the scheduled pickup;

Driver's pickup is taking longer than expected;

Driver's travel to drop-off is taking longer than expected;

Driver's app has lost tracking;

Driver is not proceeding along expected route;

Driver's app has detected a collision;

Driver is speeding;

Driver executed a hard brake;

Driver executed a rapid acceleration;

Driver executed a hard turn; and/or

Driver is texting while driving.

On-board camera has detected distracted driving.

Camera has detected inappropriate driver/passenger interaction.

Driver checked-in anomaly such as car verification failure, facial recognition verification failure, insufficient equipment (gas, decals, etc.), check-in location too far away from pick-up to make on-time arrival feasible.

Driver check-in location is close to the pick-up and is unlikely to start navigating until close to scheduled pickup time.

Driver's estimated time to arrival to pickup is significantly earlier than scheduled pickup.

Passenger pickup taking longer than expected.

A wait fee at risk of being triggered (or has triggered).

Passenger identity verification failed.

Driver indicates pickup issue via mobile app.

Passenger/Organizer indicates pickup issue via mobile app.

Driver has left designated pickup geo-fence without passenger being checked-in.

Pick-up occurs significantly earlier than expected.

Driver is navigating in a direction away from the scheduled drop-off.

Driver has made an unauthorized stop along the predicted route.

Driver indicates a passenger behavior issue via the mobile app.

Passenger indicates a driver behavior issue via mobile app.

Driver's estimated arrival time at drop-off is delayed beyond the scheduled time.

Driver's actual arrival time at drop-off is beyond the scheduled time.

Driver's estimated arrival time at drop-off is significantly earlier than the scheduled time.

Driver's actual arrival time at drop-off is significantly earlier than scheduled time.

Driver entered & left drop-off geo-fence without completing the ride in the app.

Driver entered the drop-off geo-fence but has not completed the ride in an expected amount of time.

Driver reports drop off issue via mobile app.

Analysis of in-vehicle audio/video has identified a potential issue.

If an anomaly is detected at step 203, the system proceeds to step 204 and the anomaly is categorized. In one embodiment, the reaction to an anomaly may be different depending on the category of the anomaly. At decision block 205, it is determined if the anomaly requires human intervention.

If not, the system continues to step 209 and takes automated action to deal with the anomaly. The system then proceeds to step 210 to determine if the anomaly has been resolved. If not, the system returns to step 210. If so, the system proceeds to step 208 and the ride continues. A non-urgent anomaly that does not require human intervention might be, for example, if the trip is delayed within some predetermined time frame (e.g., 5-10 minutes). In that case, an alert might be sent to the requester to inform them that pickup or drop-off might be delayed.

If the anomaly requires human intervention at step 205, the system proceeds to step 206 where the information is escalated to human support for handling, along with an alert to the requester. In some cases, the system Safe Ride Support may attempt to contact the driver to solve or remediate any risky situations.

At decision block 207 it is determined if the human intervention has resolved the situation. If not, the system returns to step 206 and human intervention efforts continue. Such efforts may include alerting enforcement and/or security personnel to take action related to the vehicle. If the problem has been resolved at step 207, the system proceeds to step 208 and the ride continues. After step 208 the system returns to step 202 until the ride has ended.

The type of anomaly may also influence the communication channel used for reporting. Some events may be transmitted to requesters, drivers, or other observers via SMS message, push message, mobile application, and the like. Some events will trigger a communication to a specialist who will take action based on pre-defined protocols. Such actions may include contact with the requester, passenger, driver or observer via phone call, SMS, or live chat. They may also include making edits to the ride, including changing the pick-up time or searching for a new driver.

In one embodiment, other anomalies may be defined by the parents or guardians of the minor and made to be part of the system as desired.

Multi-Factor Identification

One of the techniques used to provide safer rides is the use of multi-factor identification between a driver and a passenger as part of the ride scheduling process. In the prior art, passenger identification has been done by sending the driver a name and photo (shared by the passenger from their smartphone) and sending the driver's photo, license plate number, make, and model to the passenger's smartphone. More recently (especially at airports), additional procedures have been used that include providing the passenger with a code that represents either a specific pick-up location or a verification number. Unfortunately, none of the solutions deployed by traditional rideshare support a 3rd party passenger that does not have a smartphone (such as a child). Prior art techniques require information to be transmitted in real time to both the passenger and the driver.

In one embodiment of the system, the passenger is provided with a code word and that code word is transmitted to the driver. The driver must then present the code word to the passenger so that the passenger has confidence that the driver is the correct driver.

In one embodiment of the system, a multi-factor identification is used that allows for the passenger to confirm the correct driver has arrived and allows for the driver to confirm they have the correct passenger. Multiple points of identification are provided to each party and a specific protocol is conducted at pickup.

Information provided to the passenger to confirm the correct driver may include:

Name
Physical Description
Gender
Vehicle Make
Vehicle Model
Vehicle License Plate #
Driver Photo
Driver Bio
Secret Code Word or Identification Pin
Information provided to the driver to confirm the correct passenger may
include:
Name
Physical Description
Gender
Age
Birthdate
Secret Code Word Upon arrival at the destination (determined by geo-fence using GPS) the driver is provided identifying information via a mobile application. This application walks the driver through the verification procedure: first by having the driver identify the passenger visually, then the driver providing to the passenger the secret code word, then the driver asking the passenger to confirm their birthdate. The driver enters this birthdate into the application to confirm the correct passenger. This two-way exchange of information ensures the right driver and passenger are matched.

Figure 3:
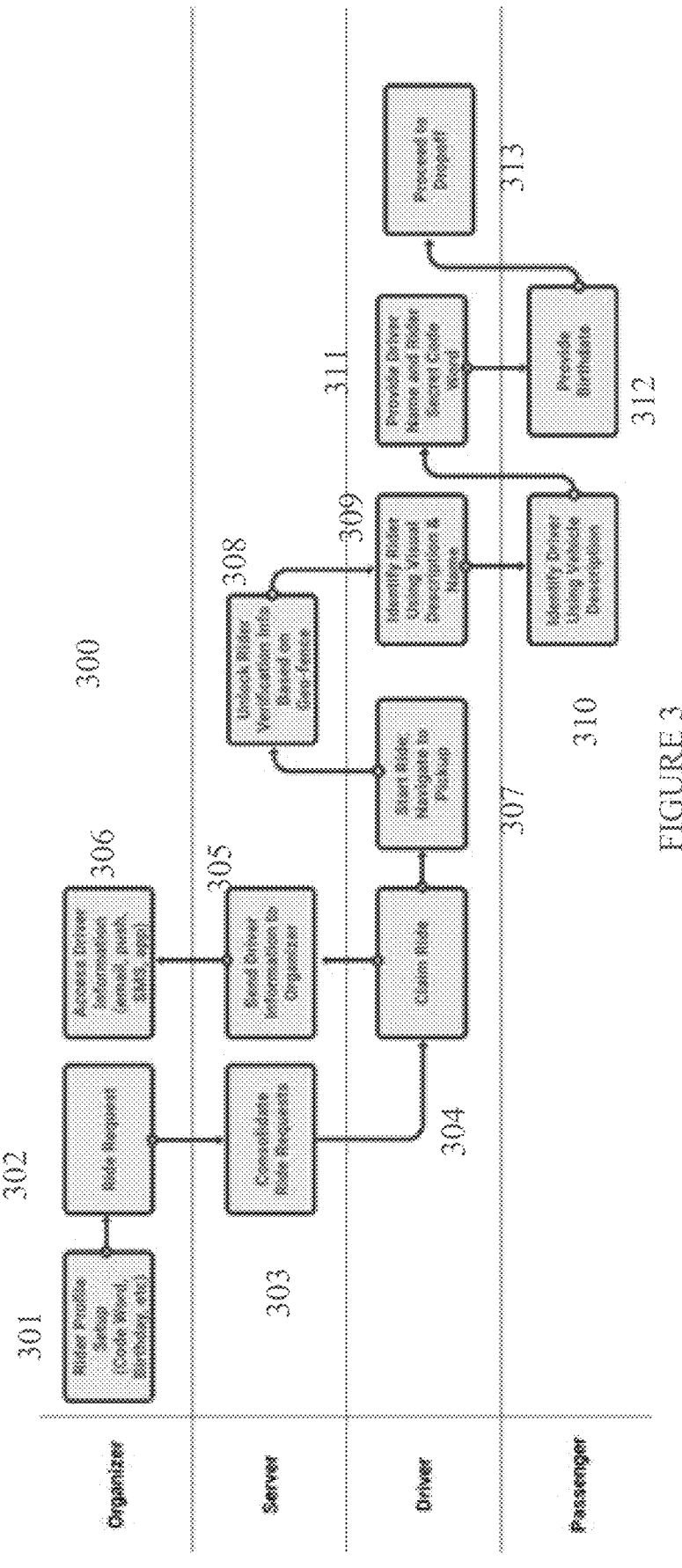
FIG. 3 is a flow diagram illustrating multi-factor identification in an embodiment of the system.

FIG. 3 is a flow diagram 300 that illustrates an embodiment of the multi-factor identification in an embodiment of the system. At step 301 the passenger profile is set up at the Organizer level, including code word, birthday, etc. At step 302 a Ride Request is received at the Organizer level. At step 303 the Server level consolidates ride requests and they are offered to drivers. At step 304 at the Driver level, a driver claims a requested ride. When that happens, the Server level sends the driver information at step 305 to the organizer level. At step 306 the driver information is accessed at the Organizer level and is made available to the requester and the passenger.

Figure 5:
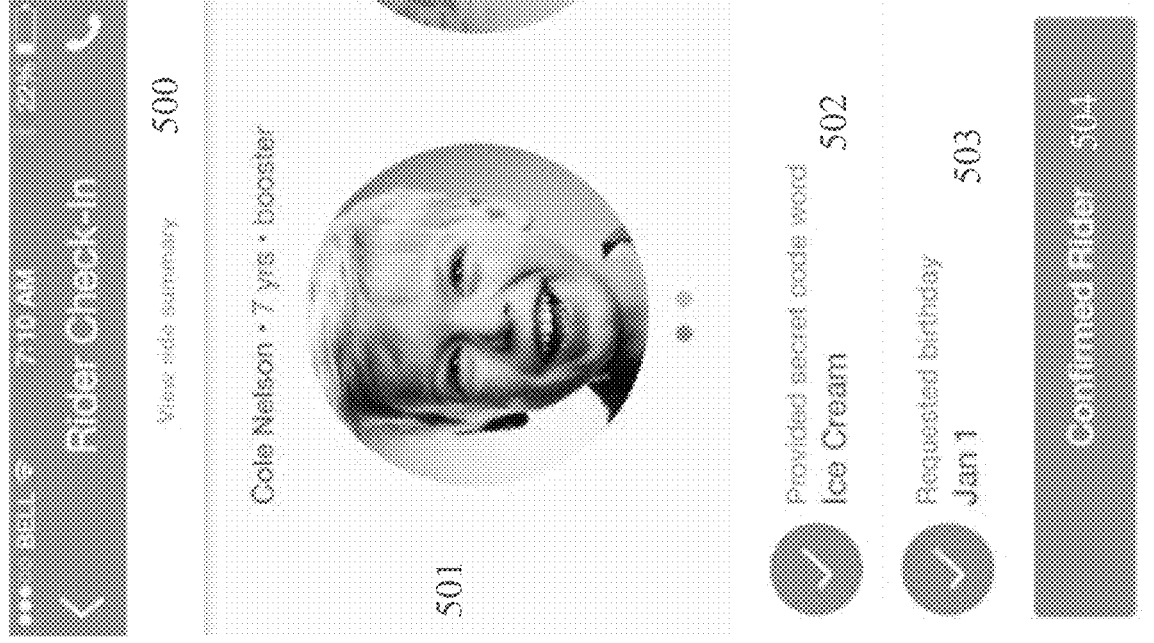
FIG. 5 is an example of multi-factor identification information provided to a driver in an embodiment of the system.

At step 307 the driver starts the ride and navigates to the pick-up location. At step 308 the Server level detects when the driver has crossed the geo-fence to the pick-up location. At this point the Passenger Verification information is unlocked and available to the driver such as shown in FIG. 5, including code word and birthdate. At step 309 at the Driver level the driver performs a preliminary identification of the passenger based on visual description, name, and the like.

Referring now to FIG. 5, the Passenger Verification information 500 presented to the Driver includes name and picture 501 of the passenger, provided secret code word 502, and requested birthday 503. Button 504 allows the driver to confirm the rider after the verified check-in has taken place.

At step 310 at the Passenger level, the passenger identifies the driver using vehicle description, license plate number, photo of the driver, and the like obtained from steps 305 and 306. At step 311 at the Driver level, the driver provides their name and the secret code word of the passenger. At step 312 at the Passenger level, the passenger provides their birthdate (or other identifying information) to the driver to provide further verification of the passenger. At step 313 at the Driver level, the passenger enters the vehicle and the vehicle proceeds to the drop-off point.

In one embodiment, the bi-directional verification includes a QR code that each party keeps on them (physically or digitally). When scanned, the QR code will confirm their information for the other party.

Figure 4:
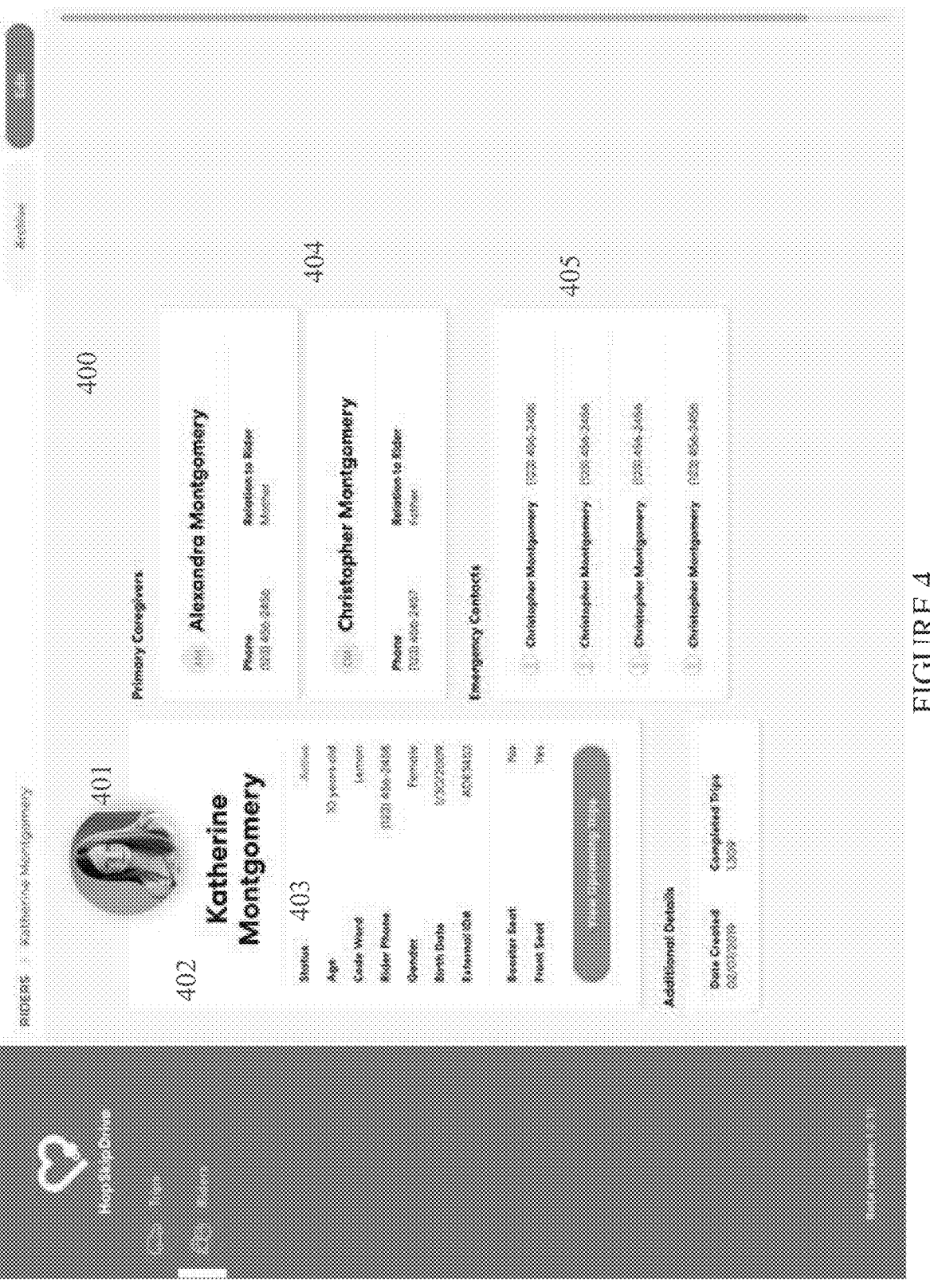
FIG. 4 is an example of a passenger profile in an embodiment of the system.

FIG. 4 is an example of a passenger profile 400 in an embodiment of the system. The profile 400 is kept by the system at the Organizer level. The profile includes a photo 401 and name 402. Region 403 includes personal information including age, code word, contact information, birth date and the like. Region 404 includes caregiver information and contact information, and other information relevant to the system. Region 405 includes emergency contacts, that may or may not be the same as the caregiver information.

Multi-User Management

The system also includes a feature to allow multiple users to collaborate in the management of transportation of a third-party passenger, with varying levels of permissions (e.g., view, edit, cancel, and the like). Prior art platforms usually allow for a single "ride organizer" (sometimes a parent booking for a child or a healthcare professional booking for a patient) to book a ride for a passenger. Unfortunately, in the case of youth transportation (and especially for vulnerable populations like homeless, foster, or special needs youth), there are a number of individuals that also need to participate in the coordination of transportation. For example, a school transportation director may be in charge of scheduling the ride, but if a child is sick in the morning the parent is the one that has first-hand knowledge that the ride needs to be canceled. Similarly, a parent may schedule a ride but want to provide ride-tracking ability to a grandparent. The 1-to-1 account:passenger relationship of other platforms does allow the full community of care to support the safety and security of these vulnerable populations.

In one embodiment, the system allows for various associations, roles, and permissions across multiple user accounts. These user accounts may be granted shared access to all rides in an account or a subset of rides (for example, for a particular passenger). This access may come with varying levels of permissions, including any permutation of view, cancel, edit, create. This allows, for example, a school transportation director to schedule a ride and grant permissions for the social worker to view the ride in real time, while granting the parent permission to view and cancel the ride (without editing details). This multi-user system ensures that in all situations, from routine to emergency, passengers are well cared for.

In one embodiment, a ride is scheduled for a 3rd party passenger via mobile app or website by a user (User 1). This user (User 1) grants other users permissions relative to the rides they have scheduled:

a. These permissions may be granted at various levels, including (but not limited to):

i. All rides managed by that account/billing entity ii. All rides scheduled by a user or group of users iii. All rides for a particular passenger or group of passengers iv. All rides for a particular location or collection of passengers b. Those permissions may grant various rights to the user, including (but not limited to):

i. Ability to schedule new rides ii. Ability to edit all specific or parts of the pickup information of scheduled rides 1. Location 2. Day/Time 3. Pickup Notes/Instructions iii. Ability to edit all specific or parts of the drop off information of scheduled rides 1. Location 2. Day/Time 3. Dropoff Notes/Instructions iv. Ability to cancel or remove a passenger from a schedule ride v. Ability to edit passenger details, including (but not limited to)

1. Name

2. Birthday

3. Picture

4. Notes/Instructions

5. Special Needs/Requirements

6. Interests vi. Ability to invite additional users and set user permissions vii. Ability to change passenger preferences such as driver gender, vehicle type or block drivers viii. Ability to rate/review drivers ix. Ability to contact the driver of a particular ride x. Ability to receive live ride information, including (but not limited to)

1. Track a driver's location on a map as the progress in real time

2. Receive notifications about a trips progress

3. Receive notifications of ride incidents/anomalies

4. Receive communications (calls, SMS, chats) from the driver or from company personnel monitoring the ride By granting permissions (or by direct invite) this new user (User 2) receives an invitation to participate in the management of a 3rd party passenger's rides. This user (User 2) may or may not be prompted to provide identifying information of the passenger or account (such as passenger birthday) to confirm that the correct user received the invitation. This user (User 2) may or may not be required to create an account in order to participate in ride monitoring/management. Based on this user's roles and permissions a website or mobile app grants them the ability to view or make changes to the ride or passenger. Permissions and associations are maintained on a server managed by the ride share platform.

Safe Driving Program

The safety of the passenger is paramount in the system. In one embodiment, a Safe Driving Program is implemented in the system. The system combines on-device telematics (GPS, accelerometer, gyroscope) that detect and analyze driving behavior with a personalized periodic (e.g., weekly) driving scorecard. This driving scorecard includes a breakdown of driving behaviors and education content (video & text) specific to their areas of weakness. In some iterations, rewards are offered to drivers either for good driving behavior or for completing optional training modules.

The scorecard contains a summary of the trips completed in the reporting period including information about earnings, cancellations and on-time arrival rate. In addition, there is a section that contains a Safety Score which is comprised of:

Phone Use While Driving

Hard Braking

Rapid Acceleration

Speeding

Hard Turns

Additional metrics, data, and the like.

Each of these sections is given a grade and based on that grade the driver may be offered a personalized combination of positive affirmation, rewards, optional learning modules, and/or incentivized learning modules.

Figure 9:
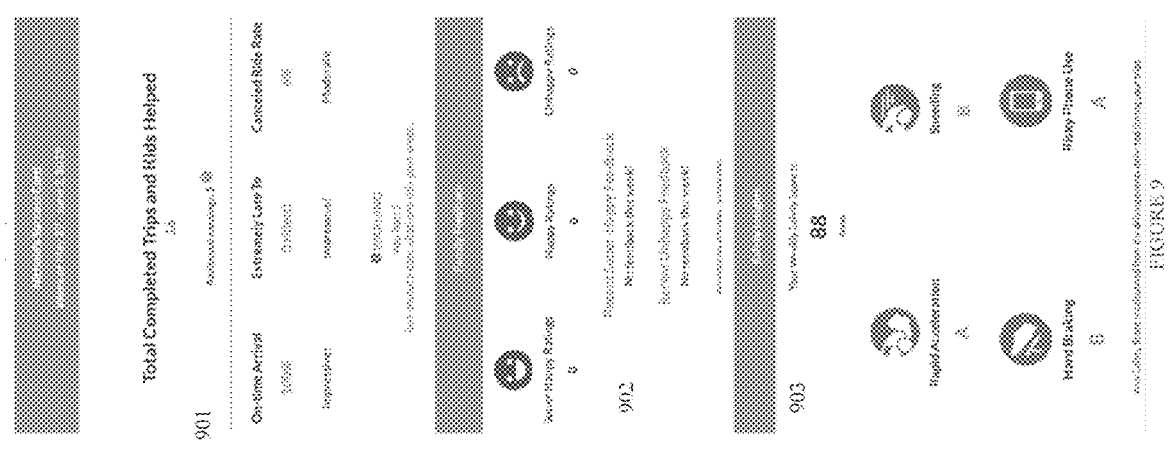
FIG. 9 illustrates a driver scorecard in an embodiment of the system.

FIG. 9 illustrates a driver scorecard 900 in an embodiment of the system. The scorecard includes a summary of trips in region 901, including on-time arrival information, lateness and delays, cancelled trips, and the like. Region 902 provides feedback from passengers and/or passenger families. Region 903 provides the Safety Score discussed above as well as letter grades for some of the metrics that are included in the safety score.

Figure 6:
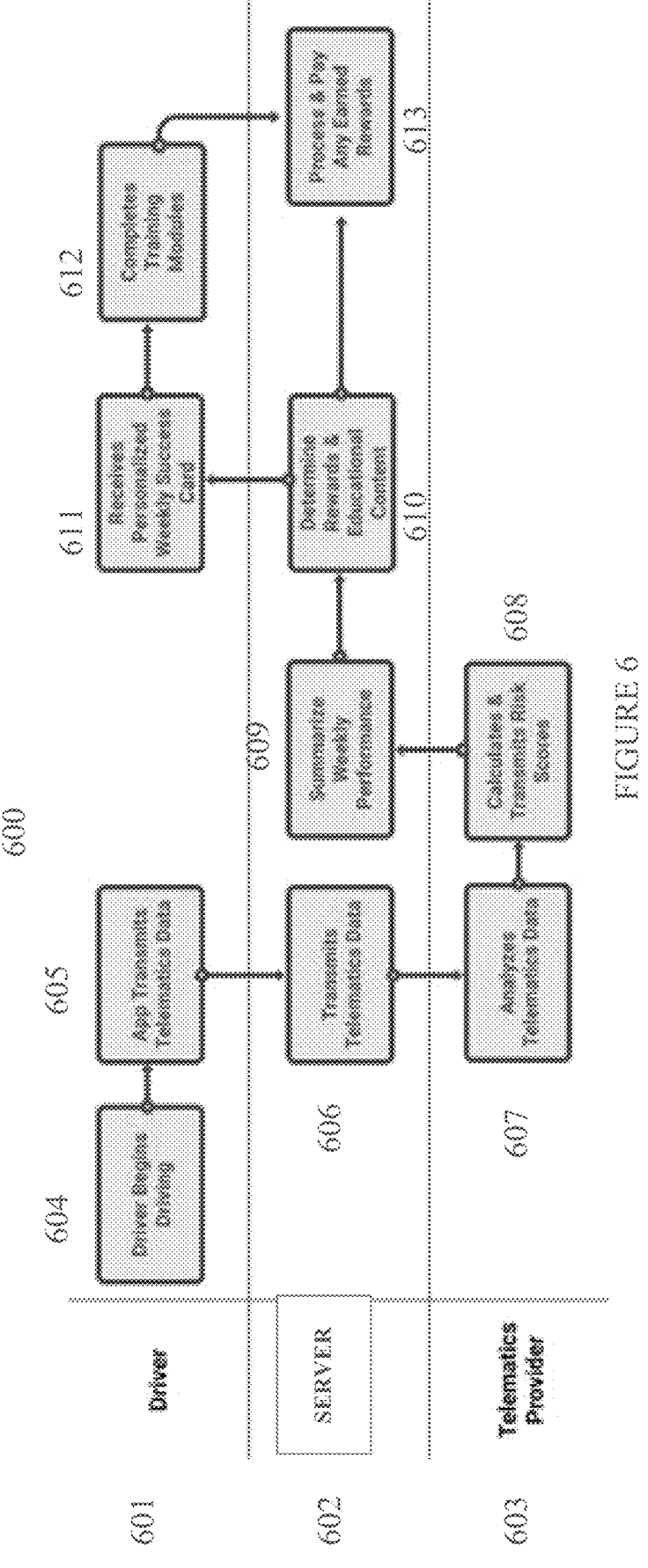
FIG. 6 is a flow diagram illustrating the operation of a safe driving program in an embodiment of the system.

FIG. 6 is a flow diagram 600 that illustrates the operation of the Safe Driving Program in an embodiment of the system. The steps are performed at a Driver level 601, Server level 602, and Telematics Provider 603. The Telematics Provider may be a third party, or the system may implement its own telematics system.

At step 604 the driver begins driving. At step 605 an onboard device and application begins transmitting telematics data. At step 606 the Server receives the telematics data and transmits it to the telematics provider who analyses it at step 607.

At step 608 the telematics provider calculates and transmits risk scores in relevant categories as desired. In one embodiment, steps 607 and 608 may be performed by the Server 602. At step 609 a weekly performance scorecard is created. At step 610 the system determines rewards and/or educational content to be provided to the driver based on the scorecard. At step 611 the driver is provided the weekly scorecard along with training modules to complete. At step 612 the driver completes the training modules. Step 613 processes and pays earned rewards to the driver.

Figure 7:
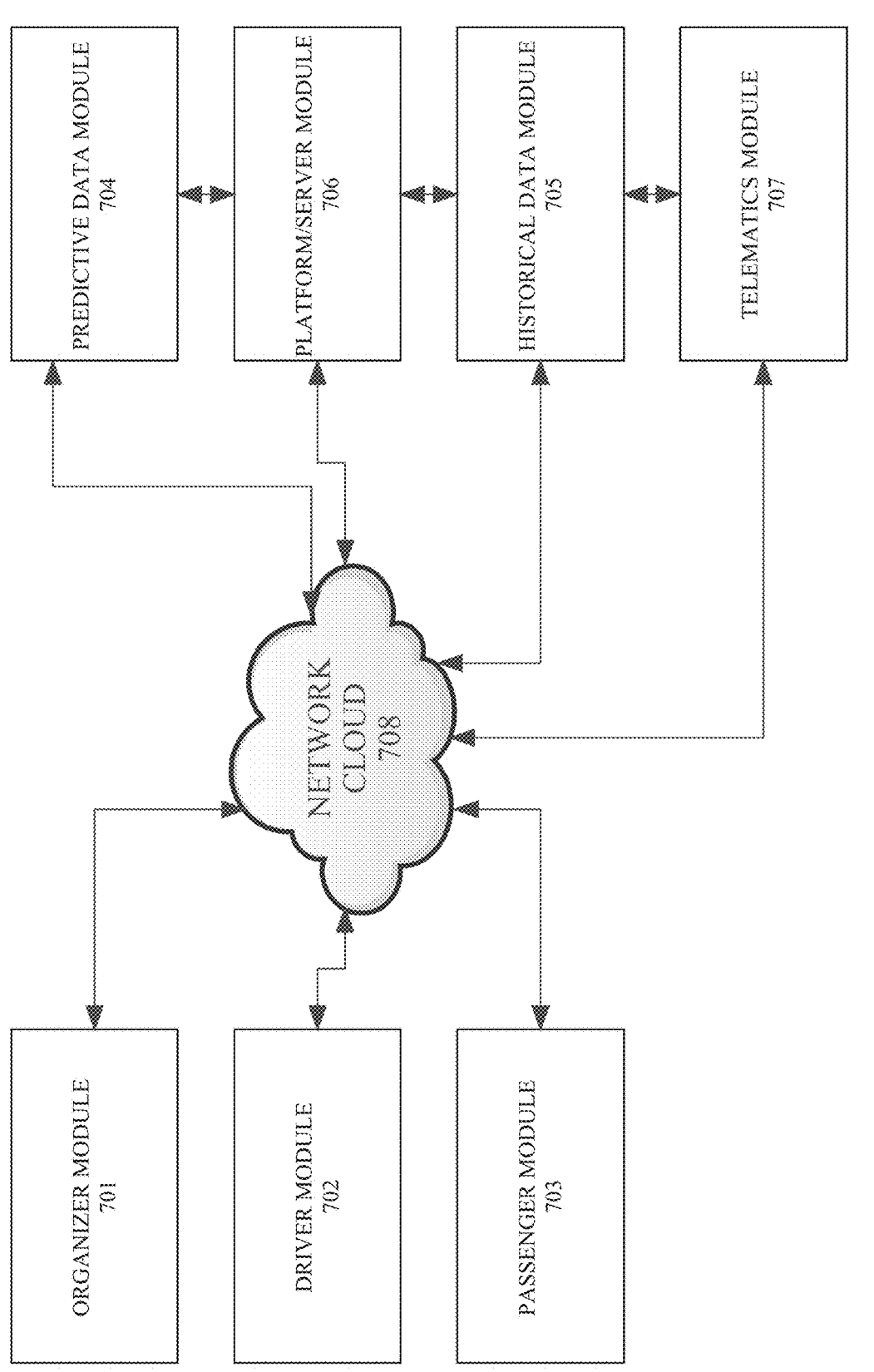
FIG. 7 is a block diagram of a practical implementation of the system.

FIG. 7 illustrates a practical application of the system through the components shown in FIG. 7. The Organizer Module 701 comprises a processing system and software that allows for the verification of an authorized organizer to initiate the scheduling of rides for one or more passengers. The Organizer Module 701 also allows the tracking of rides and the ability to initiate actions during anomalies. The Organizer Module 701 may be implemented on a computer, tablet, mobile phone, or other processing device and communicates with the Server Module 706 via Network Cloud 708 (e.g., the Internet).

The Server Module 706 implements the operation of the system, admits users, and facilitates communication between the other modules. The Server Module 706 also scores and rates drivers, offers rides to drivers, and updates metrics related to a ride based on historical data from the Historical Data Module 705 and Predictive Data Module 704.

The Historical Data Module 706 maintains a database of rides, drivers performance, passengers, and other information related to arranging and monitoring rides. The Predictive Data Module 704 accesses external information including weather reports, traffic conditions, events, road closures and other information that could impact a ride. The Server Module 706 uses this data to update and modify expected trip length, pick up times, arrival times, average speed, and the like. This provides for better closed loop tracking of a ride. Instead of using an expected arrival time based on ideal conditions, the system can identify a more realistic arrival time so that an anomaly won't be triggered prematurely due to external conditions.

The Driver Module 702 may be implemented on a laptop, mobile phone, and/or tablet computing device as purpose-built hardware and/or software programming. The Driver Module 702 is used by a driver to receive potential rides, to accept and schedule rides, to receive multi-factor identification information about a passenger, to confirm passenger identity, and to provide tracking information during the ride.

The Passenger Module 703 may be a cell phone, tablet, laptop, or other computing device that may be used by the passenger and accessed by the system to inform the passenger about the ride, and to provide additional ride tracking information. In one embodiment, the system does not require a Passenger Module 703 and can function without one as necessary.

The Telematics Module 707 is an optional module that can receive telematics information from a driver vehicle, analyze it, and communicate information to the Server Module 706. In one embodiment, those tasks can be performed by the Server Module 706.

Figure 8:
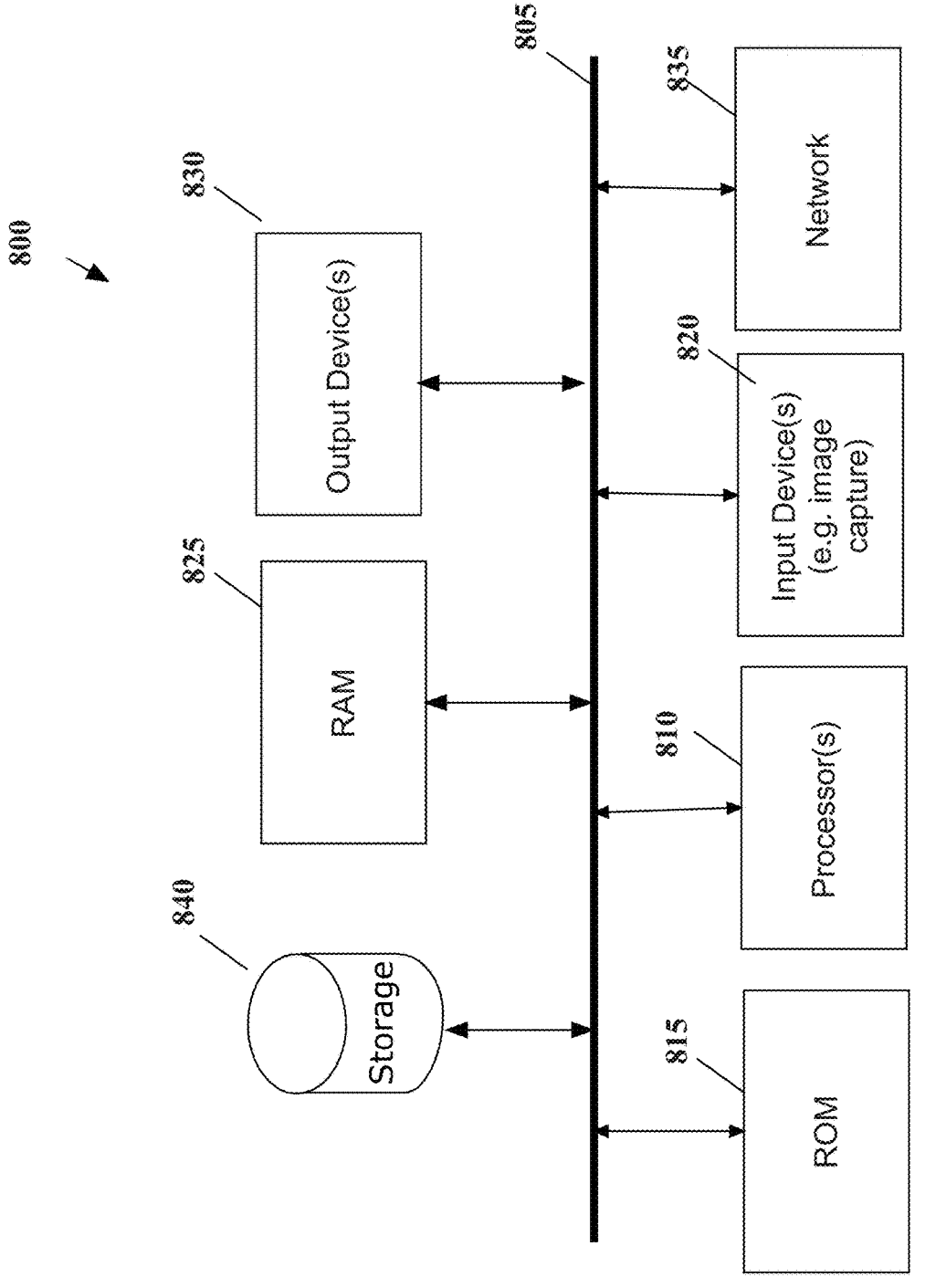
FIG. 8 illustrates an example processing environment of an embodiment of the system.

FIG. 8 illustrates an exemplary a system 800 that may implement the system. The electronic system 800 of some embodiments may be a mobile apparatus. The electronic system includes various types of machine-readable media and interfaces. The electronic system includes a bus 805, processor(s) 810, read only memory (ROM) 815, input device(s) 820, random access memory (RAM) 825, output device(s) 830, a network component 835, and a permanent storage device 840.

The bus 805 communicatively connects the internal devices and/or components of the electronic system. For instance, the bus 805 communicatively connects the processor(s) 810 with the ROM 815, the RAM 825, and the permanent storage 840. The processor(s) 810 retrieve instructions from the memory units to execute processes of the invention.

The processor(s) 810 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine-readable storage medium (also referred to as machine readable medium). When these instructions are executed by one or more of the processor(s) 810, they cause the processor(s) 810 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 810. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 800, define one or more specific machine implementations that execute and perform the operations of the software programs.

The ROM 815 stores static instructions needed by the processor(s) 810 and other components of the electronic system. The ROM may store the instructions necessary for the processor(s) 810 to execute the processes provided by the system. The permanent storage 840 is a non-volatile memory that stores instructions and data when the electronic system 800 is on or off. The permanent storage 840 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 825 is a volatile read/write memory. The RAM 825 stores instructions needed by the processor(s) 810 at runtime, the RAM 825 may also store the real-time video or still images acquired by the system. The bus 805 also connects input and output devices 820 and 830. The input devices enable the user to communicate information and select commands to the electronic system. The input devices 820 may be a keypad, image capture apparatus, or a touch screen display capable of receiving touch interactions. The output device(s) 830 display images generated by the electronic system. The output devices may include printers or display devices such as monitors.

The bus 805 also couples the electronic system to a network 835. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

Thus, a method and apparatus for ridesharing has been described.

What is claimed is:

1. A method of monitoring a ride having a driver and a passenger in a vehicle comprising:

collecting, at the vehicle, data from an onboard camera comprising real-time images or video of at least a portion of a passenger compartment and showing a human driver and a dependent passenger;

transmitting to a server vehicle data from the vehicle comprising speed, acceleration, deceleration, and turning behavior, wherein the vehicle data is a result of manual driving actions of the human driver;

transmitting to the server GPS data comprising location, route, start time, and estimated end time;

transmitting to the server contextual data comprising traffic conditions, planned route, expected ride duration, weather conditions, driver/passenger history associated with the ride, data from an onboard camera, and data generated by a ride-specific a risk scoring module configured to compute a predicted risk level for the ride prior to an anomaly detection and generating a risk score for the ride;

analyzing the vehicle data, risk score, and GPS data together with the transmitted driver/passenger history, camera data, and contextual ride data at the server to identify an anomaly in the ride.

2. The method of claim 1 wherein the vehicle data is provided by a telematics system.

3. The method of claim 1 wherein the GPS data is provided by a mobile device carried by the driver.

4. The method of claim 1 further including the step of categorizing the anomaly.

5. The method of claim 4 further including the step of determining if intervention is required based on a category of the anomaly.

6. The method of claim 5 further including the step of determining if human intervention is required based on the category.

7. The method of claim 6 wherein a human intervenes in the ride to resolve the anomaly.

8. The method of claim 6 wherein automated steps are taken to resolve the anomaly when human intervention is not required.

9. The method of claim 1 wherein the passenger is a dependent passenger.

10. The method of claim 1 wherein the passenger is a minor.

\*    \*    \*    \*    \*